Jan. 4, 1944.    G. L. DIMMICK    2,338,497
LENS COATING
Filed July 31, 1940
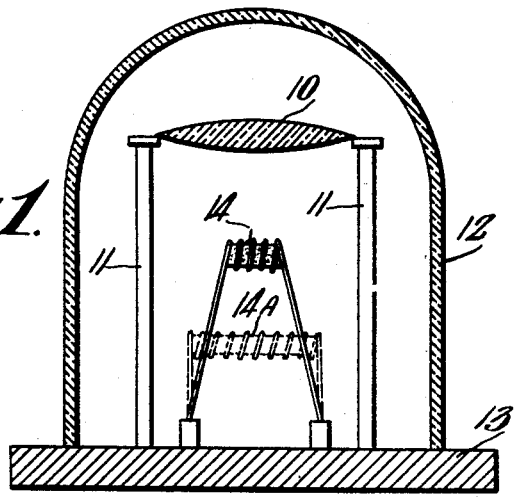
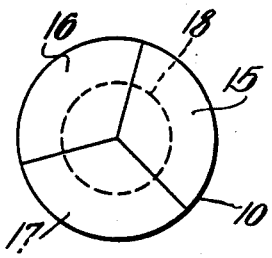
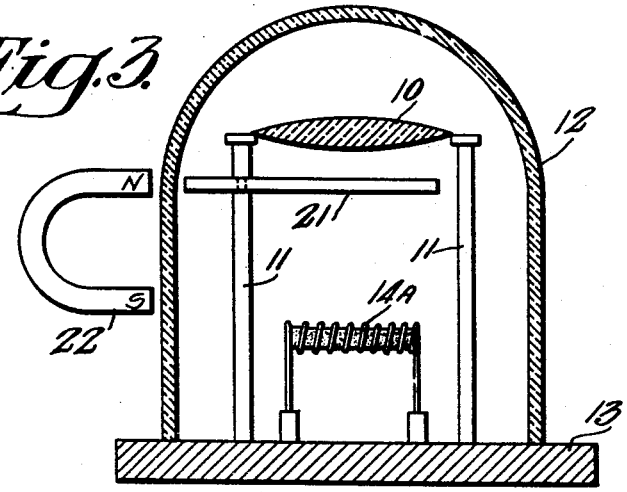
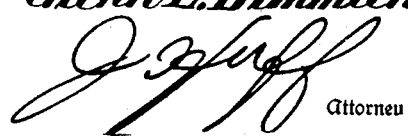
Inventor
Glenn L. Dimmick
Attorney Patented Jan. 4, 1944

2,338,497

UNITED STATES PATENT OFFICE 2,338,497

LENS COATING

Glenn L. Dimmick, Haddonfield, N. J., assignor to Radio Corporation of America, a corporation of Delaware Application July 31, 1940, Serial No. 348,897

1 Claim. (Cl. 88—1)

This invention relates to the coating of lenses with nonreflecting films in such a manner as to produce a uniform transmission over the lens area.

The coating of lenses or other optical surfaces with a thin coating of material of low index of refraction and appropriate thickness is well known. One of the materials commonly employed for this purpose is calcium fluoride which is evaporated onto the surface to a thickness of a quarter of a wave length of the light for which maximum transmission is to be secured.

The substitution of a mixture of calcium fluoride and aluminum oxide gives a layer of approximately the same light transmission as calcium fluoride but of greatly improved adherence to the surface and with considerably greater hardness than calcium fluoride alone.

In the application of such films as heretofore performed, a more or less uniform film was produced over the entire lens area which increased transmission to a minimum for a particular wave length of light. If all the surfaces of a multi-element lens were coated with films of the same thickness, a noticeably selective transmission is secured which is highly undesirable for the transmission of white light. Attempts have been made to render the transmission uniform for various colors by coating the several surfaces of lenses with layers having their highest transmission for different colors so that the average transmission was uniform. This arrangement, although satisfactory for some purposes, was not thoroughly satisfactory for use with some types of photographic lenses where the several components might be used alternatively, as the removal of one component would change the color transmission of the remaining lenses.

In the present invention, the foregoing procedure is improved by so applying the coating that each lens surface has a uniform transmission for all colors by varying the thickness of the coating either radially or circumferentially of the lens.

One object of the invention is to provide an improved nonreflecting surface in lenses.

Another object of the invention is to provide an improved method of applying thin coatings to lenses or other optical surfaces.

Another object of the invention is to provide an improved apparatus for applying evaporated coatings to lens surfaces.

Other and incidental objects of the invention will be apparent to those skilled in the art from a reading of the following specification and an inspection of the accompanying drawing, in which Figure 1 is a side view partly in section of one form of apparatus for applying the improved lens coating.

Figure 2 is a face view of a lens coated in accordance with one form of the invention, and Figure 3 is a side view partly in section of an apparatus for producing a coating such as shown in Fig. 2.

Referring first to the form of the invention shown in Fig. 1. One method to produce a film which tapers in thickness from the center of the lens to the edges is to so locate the filament from which evaporation of the coating material is accomplished at such a distance from the lens surface that the center of the lens is coated to have a minimum reflection for one color while the edge of the coating is of such thickness as to have a minimum reflection for another color. The rate at which the film is deposited at different points on the lens is inversely proportional to the square of the distance between those points and the evaporating filament. It is, therefore, possible to so place the filament with respect to the lens surface that the center of the lens is coated for minimum reflection for a color of one wave length while the edge is coated for minimum reflection for a color of a shorter wave length. In the form of the invention shown in Fig. 1, the lens is indicated at 10 and is supported on appropriate pillars 11. The entire evaporating apparatus is enclosed in an evacuated bell jar 12 supported on an appropriate base 13. The filament 14 is located much closer to the center of the lens 10 than the normal position indicated at 14a. By calculation of the distance of the filament 14 from the center of the lens surface and from the edges of the lens surface, any desired difference in film thickness may be secured. For example, the filament 14 may be located at such a distance from the center of the lens 10 that, when the coating on the center of the lens has a thickness of a quarter of a wave length for red light, that on the edge of the lens will have a thickness of a quarter of a wave length for blue light and the resultant total light transmission will be substantially uniform.

This procedure is quite satisfactory for use in such lenses as motion picture projection lenses which have no movable diaphragm, but in the case of photographic lenses which usually are provided with a circular movable diaphragm for controlling the aperture any change in diaphragm setting produces a corresponding change in the color of the transmitted light and a lens coated according to this process is therefore not entirely satisfactory for photographic purposes.

In the form of the invention shown in Fig. 2, the lens 10 is coated with films of different thicknesses in the segments indicated at 15, 16 and 17. Although three segments are indicated, it will be apparent that as few as two may be used or the number of segments may be increased to any convenient number. Each of these segments is coated to have a minimum reflection and therefore a maximum transmission in some one portion of the spectrum. For example, if two segments are used, one would have its maximum transmission in the blue-green and the other would have its maximum transmission in the orange-red; if three segments are used, one might have its maximum transmission in the red, a second in the green, and a third in the blue. If this arrangement of coating is used in a photographic lens, any variation in position of the diaphragm 18 will not affect the color of the light transmitted at the diaphragm will affect all of the segments uniformly and therefore maintain the color balance between them constant.

A lens such as shown in Fig. 2 may be made by the apparatus shown in Fig. 3, in which the parts indicated by similar reference numerals are the same as those shown in Fig. 1. In this arrangement, the filament is used at the lower position 14a which is as far as convenient from the lens 10 in order to secure a substantially uniform coating. A sector diaphragm 21 is provided which, as indicated, is pivoted on the pillar 11 and is movable into and out of position by means of the magnet 22. Although only one diaphragm 21 is indicated, it will be apparent that, as described above, the number of these sector diaphragms will correspond with the number of segments of the lens so be coated minus one.

In operating this apparatus, the lens may be placed in position with the sectors open so that they do not interfere with the passage of evaporated material to the lens. The material is then evaporated onto the lens until a uniform layer is produced over the entire surface of such thickness as to produce a minimum reflection for the color of the shortest wave length, such as the blue. One of the sectors is then moved into position by means of the magnet and the evaporation is continued until the uncovered portion of the surface has a coating giving the minimum reflection for the next wave length, such as the green. A second sector may then be moved into position and the coating continued on the remainder of the surface until a minimum reflection is reached in the red, when the evaporation is stopped. If only two colors are to be used, only one sector or diaphragm is necessary, and, if more colors are to be used, a correspondingly greater number of sectors would be used. It may be desirable in some instances to use a considerably larger number of sectors than the number of film thicknesses which are used. For example, there may be two or more segments of the lens for each film thickness and the manipulation of the sector shields would be changed to correspond.

In an alternative procedure, the sectors may be placed accurately in position and the bell jar evacuated and a coating is then applied having a thickness corresponding to the difference between the maximum coating desired and the coating next in thickness. For example, if only two sectors of the lens are to be used, a coating would be applied having a thickness corresponding to the difference in wave length between blue light and red light, and the thickness of this coating could be determined by ascertaining the reaching of minimum transmission for light having a wave length corresponding to the difference in the wave length of the said two colored lights. This wave length difference would be approximately in the violet and, by observing the change in reflection through a violet filter and stopping the coating when a minimum in that color was reached, the appropriate thickness would be secured. The sector diaphragm or shield 21 is then removed from position and the coating process is resumed until the portion which is already coated has reached a minimum reflection in the red and the portion plotted by the shield 21 will have then reached a minimum reflection in the blue. Similarly, if three segments as shown in Fig. 2 are to be coated, two segments will be shielded and the first segment will be coated to a thickness corresponding to the difference between the wave lengths of the red and the green light, for example. One shield is then removed and a second layer is applied corresponding to a difference in wave length between the green and the blue light. The second shield is then removed and the coating is continued until the third sector reaches a minimum reflection for the blue light when the first segment will have reached a minimum reflection for red light and the second one will have reached a minimum reflection for green light.

Although the term "lens" has been used in the specification as referring to the optical unit which is to be coated, it will be obvious that this term is used in its broadest sense and refers generally to any optical element or light-transmissive unit in an optical system and may include color filters, prisms, protective plates or any other light-transmitting element and the method may similarly be applied to light-reflecting devices having a light-transmitting element on their surface or into light-absorbing devices where it is desired to eliminate surface reflection.

It will be apparent to those skilled in the art that the application of the second method above described is not limited to the use of a diaphragm covering a sector or segment of a circular element as the diaphragms or shields may be made in any appropriate form to accomplish the desired result. For example, if a rectangular element is coated the surface of which is to be obscured by a linearly moving member, the coating may be in the form of stripes parallel to the direction of movement of the movable member. Also the use of a grating or perforated screen falls within the scope of the invention. For example, a screen with a plurality of perforations may be used and the first coating applied to the perforations and the screen then removed or shifted in position and a second coating then applied, and, if a third coating were to be applied, the screen would be completely removed, giving three different types of nonreflective areas.

When a plurality of lenses or surfaces such as shown in Fig. 2 are used, they are preferably so arranged that surfaces having complementary transmissions are in optical alignment. For example, if a single lens is used, one-half of each side will have maximum transmission in the orange-red and the other half a maximum transmission in the blue-green, while, on the opposite side, the relation of the transmissions will be reversed so that each half of the lens will have the same transmission as the other half. The corresponding arrangement would be used in the case of three-element lenses coated in three sectors.

Having now described my invention, I claim:

An optical element having a transparent reflection reducing coating on one surface thereof arranged in radial segments each segment being throughout of different thicknesses and areas than each of the other segments so that the total transmission for light of different colors is substantially uniform.

GLENN L. DIMMICK.